(12) United States Patent
Nocon (10) Patent No.: US 10,931,002 B1
(45) Date of Patent: Feb. 23, 2021

(54) LIGHT TRANSMITTING WEARABLE DEVICE WITH TRANSPARENT AND TRANSLUCENT COMPONENTS

(71) Applicant: Disney Enterprises, Inc., Burbank, CA (US)

(72) Inventor: Nathan D. Nocon, Valencia, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/579,053

(22) Filed: Sep. 23, 2019

(51) Int. Cl.
*H01Q 1/27* (2006.01)
*G04B 45/00* (2006.01)
*G06F 3/03* (2006.01)
*G06F 3/01* (2006.01)

(52) U.S. Cl.
CPC ............ *H01Q 1/273* (2013.01); *G04B 45/00* (2013.01); *G06F 3/014* (2013.01); *G06F 3/0304* (2013.01)

(58) Field of Classification Search
CPC .............. H01Q 1/273; G06F 3/014; G06F 3/0304–0308; G04B 45/00–046
See application file for complete search history.

(56) References Cited

U.S. PATENT DOCUMENTS

| | | | |
|---|---|---|---|
| 10,175,653 B1* | 1/2019 | Bloom | G04B 45/00 |
| 10,211,520 B2 | 2/2019 | Szini et al. | |
| 10,520,895 B2* | 12/2019 | Kim | G04G 21/025 |
| 2008/0004510 A1* | 1/2008 | Tanzawa | A44C 5/0015 600/301 |
| 2012/0082012 A1* | 4/2012 | Blanckaert | G04B 37/225 368/224 |
| 2012/0201049 A1* | 8/2012 | Sherman | F21V 7/0091 362/602 |
| 2013/0121015 A1* | 5/2013 | Tjalsma | A44C 15/0015 362/570 |
| 2014/0168951 A1* | 6/2014 | Briere | A01K 27/006 362/103 |
| 2015/0323788 A1* | 11/2015 | Zou | G02B 27/017 359/630 |
| 2015/0342307 A1* | 12/2015 | Weber | D03D 1/00 368/282 |
| 2017/0045916 A1* | 2/2017 | Kim | G06F 1/1698 |
| 2017/0084133 A1* | 3/2017 | Cardinali | G04G 21/00 |
| 2017/0214422 A1* | 7/2017 | Na | H01Q 5/35 |
| 2018/0046283 A1* | 2/2018 | Yoshida | G06F 3/044 |
| 2018/0062245 A1* | 3/2018 | Wu | H01Q 9/28 |
| 2018/0103730 A1* | 4/2018 | Fostinis | A44C 5/14 |
| 2018/0110465 A1* | 4/2018 | Naima | A61B 5/681 |
| 2018/0314416 A1 | 11/2018 | Powderly et al. | |

\* cited by examiner

*Primary Examiner* — Gennadiy Tsvey
(74) *Attorney, Agent, or Firm* — Patterson + Sheridan, LLP (57) ABSTRACT

A wearable electronic device is described. The wearable electronic device uses a light within a housing of the electronic device to illuminate an optically connected band, such as a watch band which provides interactive displays and features to a user. The positioning of the light source within the housing allows for the interactive display in the connected band without increasing the size and/or complexity of the electronic device itself.

18 Claims, 8 Drawing Sheets

LIGHT TRANSMITTING WEARABLE DEVICE WITH TRANSPARENT AND TRANSLUCENT COMPONENTS

BACKGROUND

Field of the Invention

This present disclosure relates to the visual display of various interactive optical outputs on wearable devices, such as smartwatches, where the wearable devices/smartwatches are limited in size.

Description of the Related Art

Wearable devices such as smartwatches have greatly increased in use among the general population. With this increased use, various capabilities and features have been added to wearable devices in order to provide increased function and utility to these devices. For example, various displays and lighting have been used to create visually pleasing and interactive experiences for users of wearable devices. However, increasing the features and or functions of a wearable device often comes with an increase in computational resources, increase of electrical and mechanical components, and or an increase in cost, which in some cases can also increase the overall size of these wearable devices such that the devices become too large for some users to wear comfortably. Or in which adding components can be cost prohibitive or limiting to other desirable features of a wearable device, e.g. waterproofing.

SUMMARY

One embodiment includes a wearable electronic device. The wearable electronic device includes: a base assembly including: a processing unit; one or more transparent antennas; a band interface; and a light source optically coupled to the band interface, where a light emitted by the light source passes through at least a subset of the one or more transparent antennas; and a translucent band coupled to the band interface, where the band is illuminated by the light emitted from the light source of the base assembly. Other embodiments of this aspect include corresponding computer systems, apparatus, and computer programs recorded on one or more computer storage devices, each configured to perform the actions related to wearable device.

One embodiment includes an apparatus. The apparatus includes: a base assembly including: a processing unit; one or more transparent antennas; a passive display interface; and a light source optically coupled to the passive display interface, where a light emitted by the light source passes through at least a subset of the one or more transparent antennas; and a translucent passive display coupled to the passive display interface, where the passive display is illuminated by the light emitted from the light source of the base assembly. Other embodiments of this aspect include corresponding computer systems, apparatus, and computer programs recorded on one or more computer storage devices, each configured to perform the actions of the methods.

One general aspect includes a system including: one or more transparent antennas; a band interface; a light source optically coupled to the band interface where the one or more transparent antennas are disposed between the light source and the band interface; a translucent band coupled to the band interface; a computer processor; and a memory containing a program which when executed by the computer processor performs an operation. The operation includes including: receiving an input signal; determining an illumination plan for the translucent band based upon the input signal; driving the light source to generate a light according to the determined illumination plan, where the light illuminates the translucent band according to the illumination plan via the band interface. Other embodiments of this aspect include corresponding computer systems, apparatus, and computer programs recorded on one or more computer storage devices, each configured to perform the actions of the methods and operations.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Wearable interactive and intelligent devices are an ubiquitous part of many people's daily lives, offering enhanced services and functions for users wearing and interacting with the devices. These devices often provide both utility type services and entertainment focused services. The utility services include functions such as biometric monitoring, communication, and information services. The entertainment type services include functions such as audio playback, interactive displays, and interactive lighting features providing a user with visual displays and feedback on their interactions with the wearable devices. As the number and type of services offered on the wearable devices increases, additional circuitry and other components are often needed to support the services.

For example, a smartwatch may include application and services which provide interactive displays on a display of a watch body and interactive displays in an associated watch band. The watch band may include lighting features embedded in the band, but these lighting features require additional lights and electronics in the band itself and/or cause the watch body of the smartwatch to increase in size so that light features are positioned in the watch body and near the connected watch band. The light features on the watch body may be positioned outside of various electronic components within the body of the watch (e.g., on the perimeter of the watch body) so that the light is not blocked by the various electronic components between the light features and the connected band.

Furthermore, additional interactive features increase the cost of the wearable devices as mentioned above. For example, in a specific use environment such as an amusement park, etc., the cost of an individual limited use wearable device becomes increasingly prohibitive as the interactive features of the wearable device increase. Additionally, parents or others may not want to spend large amounts on children focused devices that may be limited in time of use and scope. Moreover, as discussed above, a child may be unable to wear a smartwatch (whether purchased or loaned out as part of an interactive experience) with additional features such as an interactive watch band since the size of the smartwatch may be too large.

The system and devices described herein provide a wearable device that provides increased or enhanced interactive capabilities through a passive display interface such as a translucent watch band without increasing the size, complexity, and cost of the smartwatch body. The devices include a light source positioned within a housing of the wearable device, decreasing the need to expand the size of the device and includes transparent antennas that will not interfere with light emitted by the light source such that the light source within the wearable device can illuminate the passive display interface/translucent band without increasing the size and complexity of the device.

Figure 1:
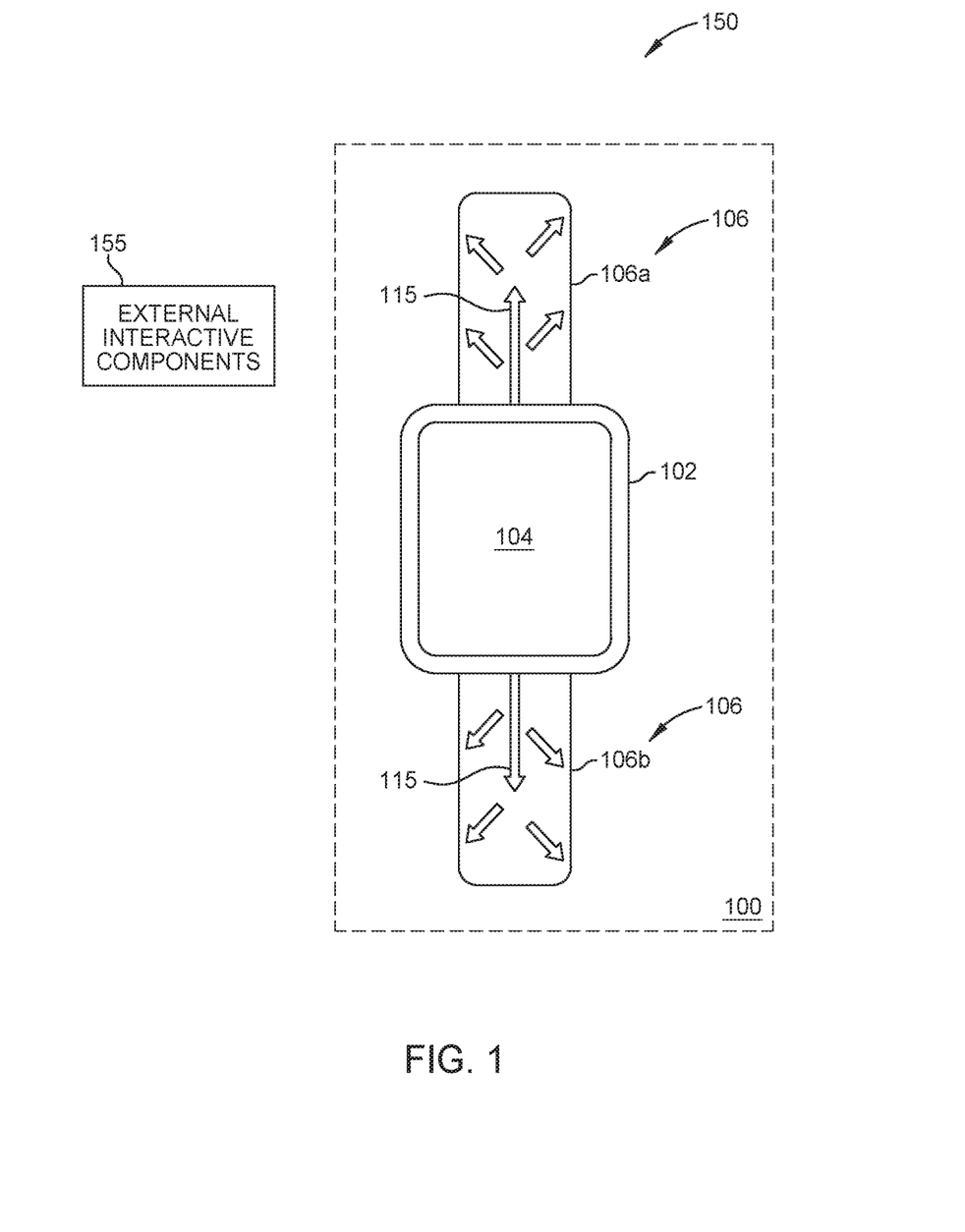
FIG. 1 depicts a wearable electronic device in an interactive environment, according to one embodiment described herein.

FIG. 1 depicts an electronic device, device 100, in an interactive environment, environment 150, according to one embodiment described herein. The electronic device, device 100, is depicted as a wearable or wrist worn device or a watch (e.g., a smartwatch). The device 100 may also include other types of devices that are worn by a user on a wrist, an arm, around the head, etc. The device 100 may also be a non-wearable device with a connected translucent passive display. While shown in the environment 150, the device 100 may function outside of the environment 150, or in multiple interactive environments.

In FIG. 1, the device 100 includes a band 106 that allows for a user to wear or couple the device to the user during use. For example, the band 106, including band portions 106a and 106b, may include latch/connection portions that join the band portions 106a and 106b together to couple the device 100 to the user. In some examples, the band portions 106a and 106b are fixed bands attached to a base assembly housing (e.g., a housing 102) via a band interface as described in relation to FIG. 3A-B. In some examples, the band portions 106a and 106b are a single piece (shown in two sections in FIG. 1) that forms the band 106. The band portions 106a and 106b may also be removably attached to the housing 102 such that the band 106 may be interchanged or replaced. For example, a user may replace the band 106 based on color preference, illumination preferences, etc., as discussed herein. In one embodiment, the band 106 is composed of a translucent material such as plastic or rubber that emits light, glows, etc. when light is emitted through the bands such as through a band interface (not shown). The bands may also include one or more light altering features embedded in the band which provide interactive feedback to a user when illuminated such as described in relation to FIG. 3E.

The device 100 also includes a housing 102 and a display 104. The housing 102 and display 104 enclose/encase the various electronic components of the device 100. In some examples, the display 104 is a touchscreen display including a glass display, liquid crystal display (LCD), or other type of display which provides an interactive user interface to a user of the device 100.

As discussed herein, the device 100, including the band 106, provides an interactive display by emitting light 115 through a passive interface provided by the band 106. In some examples, a user wearing the device may perform actions in the environment 150 which cause the device 100 to illuminate the band 106. For example, in response to a user approaching a certain area of an amusement park, the band may illuminate. The device 100 detects that the user has approached this area when it detects external interactive components 155 via radio or other methods described herein, and in response, illuminates the band 106. In one embodiment, the band is passively illuminated via a light source(s) embedded in the housing 102 as described in relation to FIGS. 2A-B.

Figure 2A:
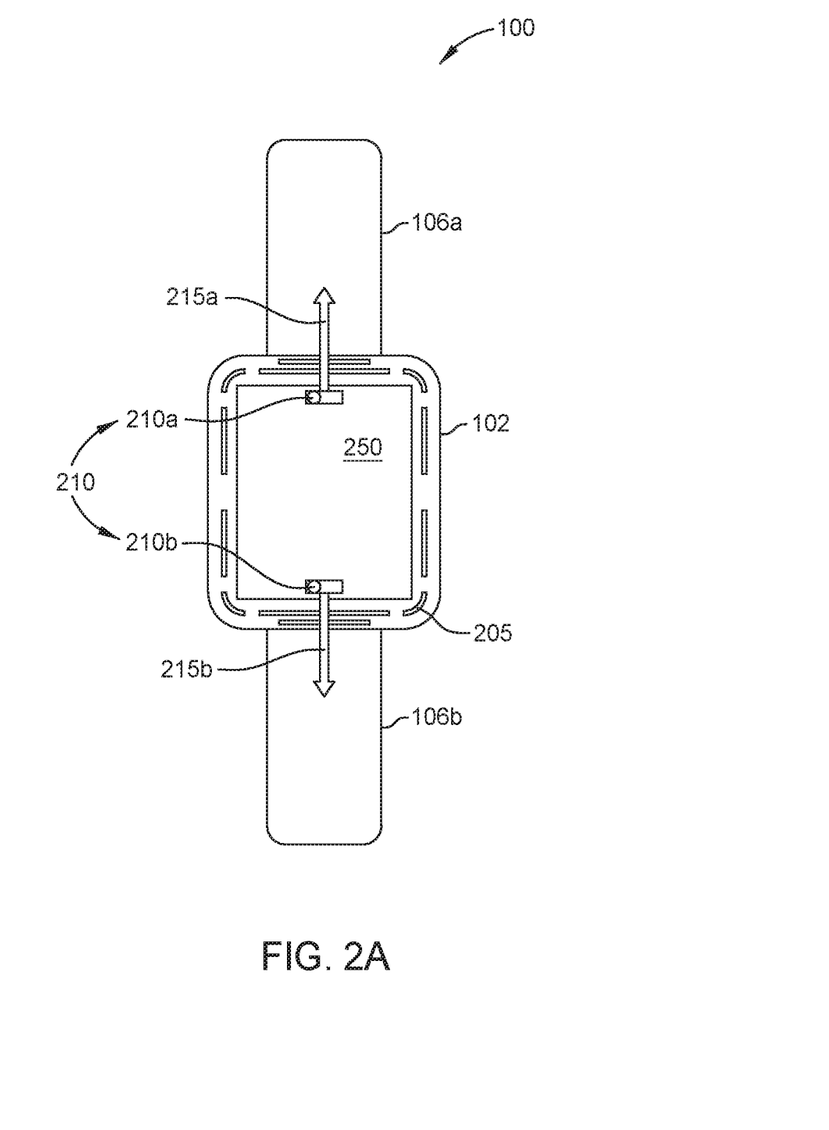
FIGS. 2A-B are top views of a wearable electronic device, according to embodiments described herein.

FIG. 2A is a top view of wearable electronic device, according to one embodiment described herein. As shown, the device 100 includes the printed circuit board assembly (PCBA) 250. In some examples, PCBA 250 provides a base assembly for electronic components of the device 100. For example, light sources 210 are affixed or attached to the PCBA 250. The light sources 210 may include multiple independent lights sources such as light sources 210a and 210b. The PCBA 250 may also include one or more processing units as described in relation to FIG. 4. The PCBA 250 also includes antennas 205 which provide over the air communication abilities for the device 100. For example, the antennas for 3G and 4G services, Global Navigation Satellite System (GPS/GNSS) services, Wi-Fi and Bluetooth communication, and near field communication (NFC) services. The antennas for each of the services may be independent antennas within the antennas 205 or integrated together as the antennas 205.

The antennas 205 are transparent antennas (i.e., made of transparent materials) which allow light emitted by the light sources 210 to pass through the antennas 205. The light sources 210 may include any type of light emitting source including a light emitting diode (LED) (e.g., a red-green-blue LED). The light 215a emitted by the light source 210a passes through the antennas 205 to the band 106. As shown in FIG. 2A, the light source 210a is positioned inside of the housing 102 in order to provide a direct side illumination to the band 106 via a band interface as discussed in relation to FIG. 3A. The direct side illumination optically couples the light (e.g., lights 215a and 215b) to the band interface and the band 106.

In this example, the light sources 210a and 210b do not have additional light tracing or piping and instead provide direct illumination of the band portions 106a and 106b. The location or position of the light sources 210 within the housing 102 and not between the antennas 205 and the band portions 106a and 106b allows for the housing 102 to be compact such that the device 100 can be constructed small enough to fit on a smaller user's (e.g., a child) wrist. Additionally, the integration of the light sources 210a and 210b directly onto the PCBA 250 allow for simpler fabrication methods for the device 100 such that costs of the device remain low.

Figure 2B:
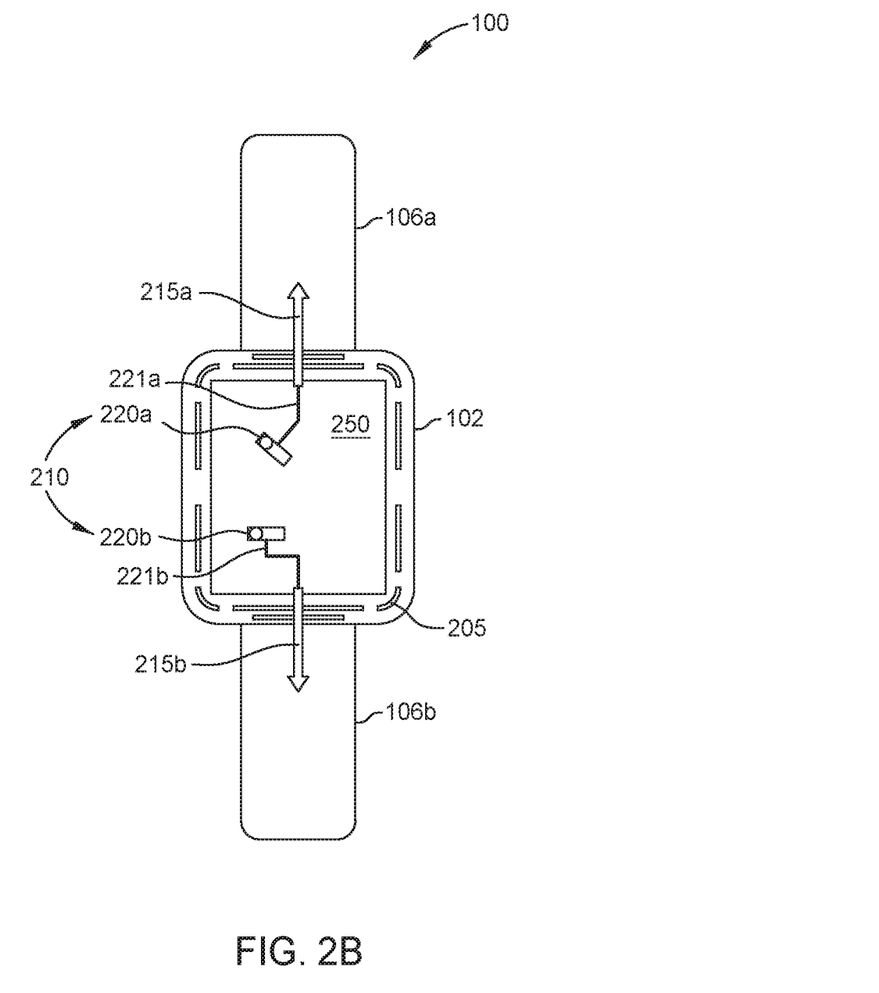

FIG. 2B is a top view of wearable electronic device, according to one embodiment described herein. In this example, the light sources 220a and 220b are positioned at locations on the PCBA 250 and are connected to light tracing and piping in order to optically couple to the band 106. For example, the light sources 220*a-b* may be optimally positioned on the PCBA 250 away from a portion of the PCBA that would allow direct side illumination into the band portions 106*a-b*. Light traces 221*a* and 221*b* provide an optical path for the light emitted by the light sources 220*a-b* to reach the band interface discussed in FIG. 3B and to emit through the band portions 106*a-b*. The light traces 221*a*-221*b* may include any light carrying medium including a metallic material, plastic material, and other material to propagate light emitted from the light sources 220*a-b* to the band portions 106*a-b*. In some examples, the device 100 may include a mixture of the light sources 210*a*-210*b* and 221*a* and 221*b*. For example, a light source may be positioned to provide direct side illumination on one band interface and positioned to use a light trace via another band interface.

Figure 3A:
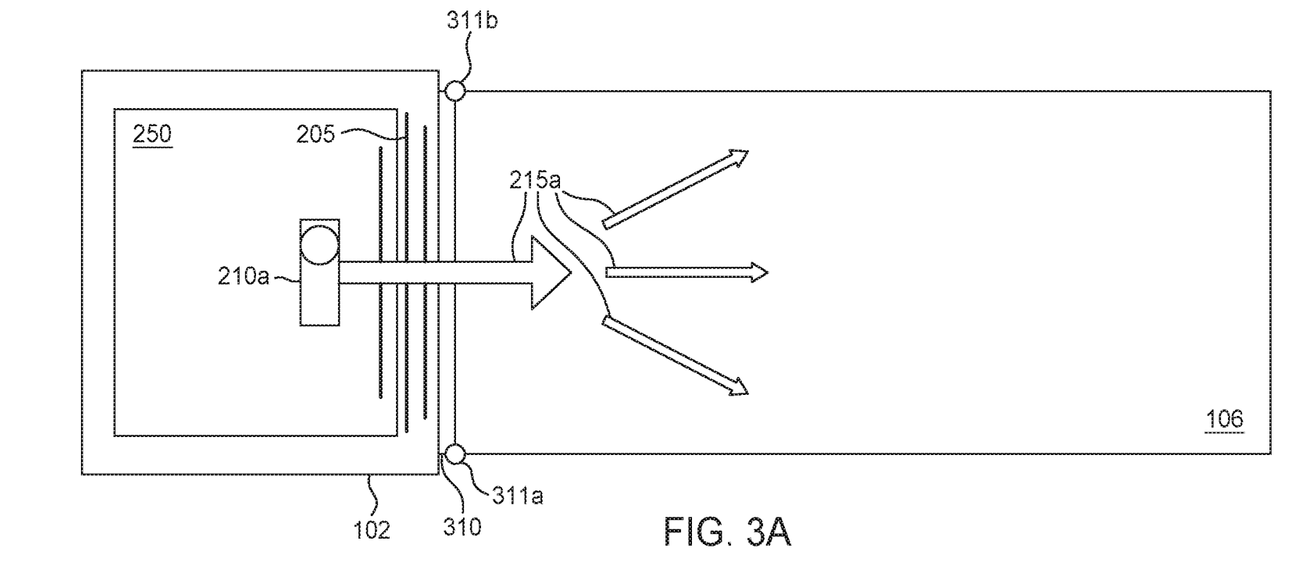
FIG. 3A is a top view of wearable electronic device and band interface, according to one embodiment described herein.

FIG. 3A is a top view of wearable electronic device and band interface, according to one embodiment described herein. As shown, the light source 210*a* emits the light 215*a*. The light 215*a* passes through the transparent antennas, antennas 205, and through a band interface 310. The light 215*a* disperses in and illuminates the band 106. In some examples, the band 106 does not include any electronics and relies on the light 215*a* emitted via the band interface 310 to illuminate. This simplicity allows for the device 100 to provide an interactive display via the passive display of the band 106, without increasing the size and complexity of the device 100.

Figure 3B:
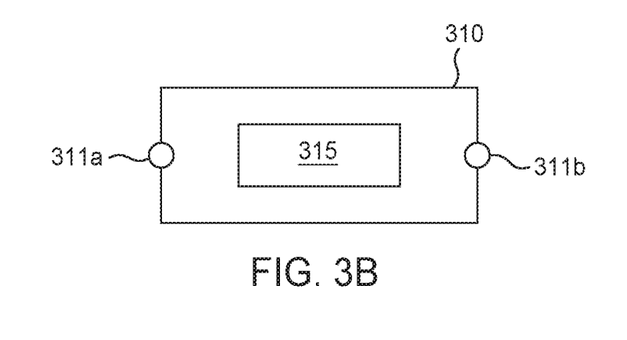
FIG. 3B is a side view of a band interface, according to one embodiment described herein.

FIG. 3B is a side view of the band interface 310. The band interface includes an optical portal 315 in the band interface 310 which allows the light to pass through the housing 102 and band interface 310 and into the band 106. In some examples, the band interface 310 is a component or portion of the housing 102. In some examples, the band 106 is removably coupled to the band interface 310 and the housing 102 via the connection points 311*a* and 311*b*. These connection points join the band 106 to the housing 102 and may be manipulated to release the band 106 in order for the band to be interchanged or replaced. For example, an alternate band may provide a different color, different illumination scheme, or other features when illuminated via the band interface 310.

Figure 3C:
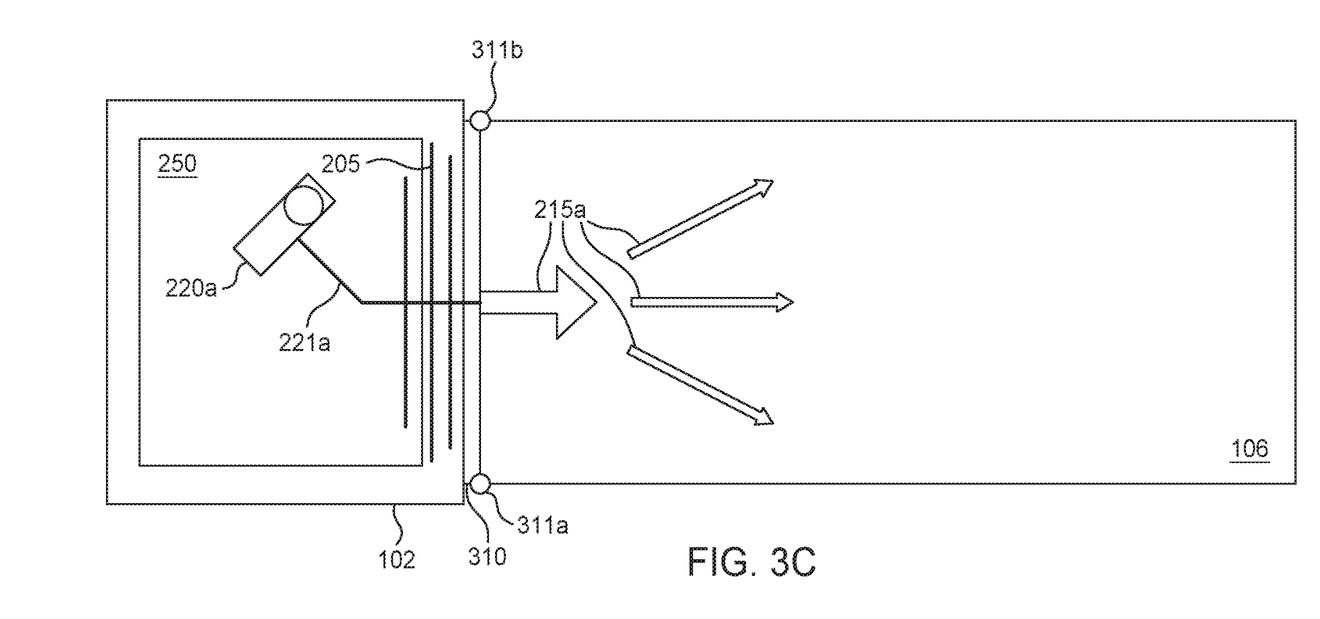
FIG. 3C is a top view of wearable electronic device and band interface, according to one embodiment described herein.

FIG. 3C is a top view of wearable electronic device and band interface, according to one embodiment described herein. As shown, the light source 220*a* emits the light 215*a* which passes through the light trace 221*a*, through the transparent antennas, antennas 205, and through a band interface 310. The light 215*a* also disperses in and illuminates the band 106. In some examples, the light trace 221*a* is connected to the optical portal 315 of the band interface 310 which allows the light 215*a* to pass through the housing 102 and band interface 310 and into the band 106.

Figure 3D:
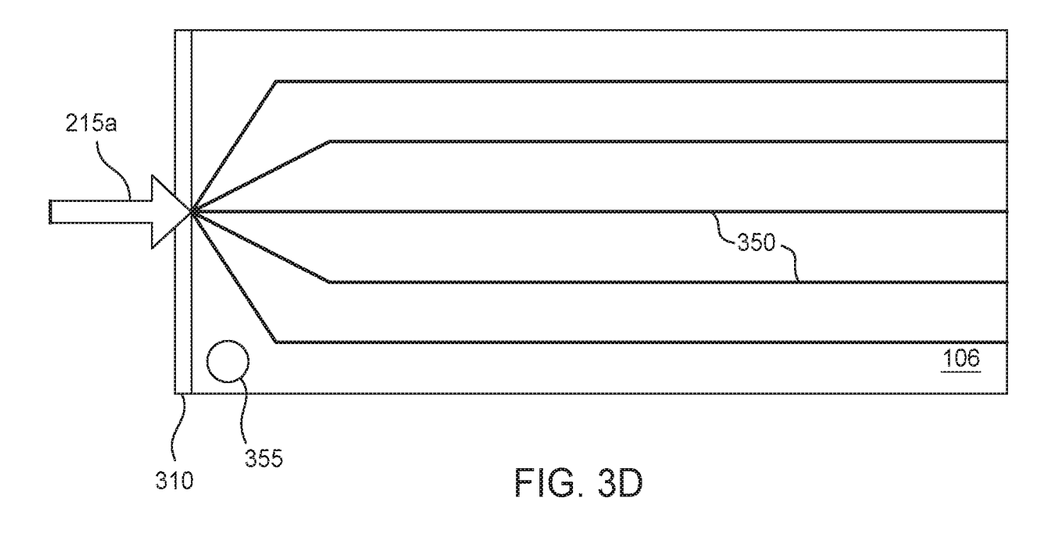
FIG. 3D is a top view of band with light altering features, according to one embodiment described herein.

FIG. 3D is a top view of band with light altering features, according to one embodiment described herein. The band 106 includes features 350 which direct the light 215*a* emitted via the band interface 310 to various portions of the band 106 in order to illuminate the band 106 according to a pattern or other feature. The illumination of the features 350 or the band 106 in response to user or other actions provides interactive feedback to the user. The band 106 also includes a feature identifier 355 which may include a radio-frequency identification (RFID) tag or other identification mechanisms that can identify the features 350 to the device 100.

Figure 4:
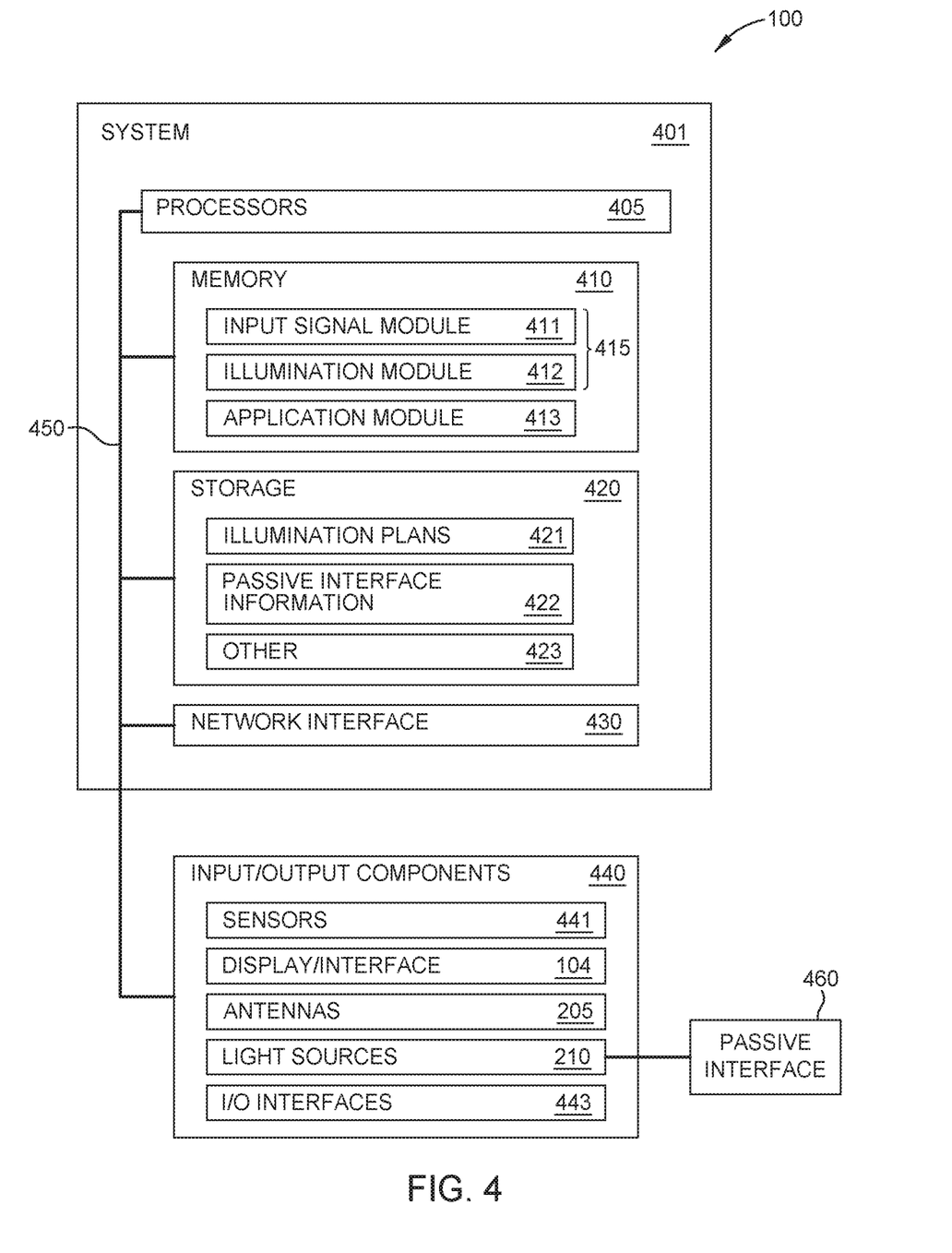
FIG. 4 illustrates a block diagram of a system, according to one embodiment described herein.

FIG. 4 illustrates a block diagram of an system 401, the device 100 may include a computer and/or computing device embodied as wearable device, smartwatch, or other apparatus, etc. (referred to herein as system 401 for reference), which executes the functions of the device 100, and perform the methods described herein. The components of system 401 may include, but are not limited to, one or more processing units or processors 405, a system memory, memory 410, a storage system 420, a bus 450 that couples various system components including the memory 410 and storage system 420 to processors 405 along with an external network interface 430, and input/output components 440. The input/output components include sensors 441, display 104, antennas 205, light sources 210, and I/O interfaces 443.

Memory 410 may include a plurality of program modules 415 for performing various functions related to providing an interactive display to a user via the device 100, described herein. The program modules 415 generally include program code that is executable by one or more of the processors 405. As shown, program modules 415 include input signal module 411, and illumination module 412, and application module 413. In some examples, the program modules 415 may be distributed and/or cloud based applications/modules. Additionally, storage system 420 may include media for illumination plans 421, passive interface information 422, and other information 423. The information stored in storage system 420 may be updated and accessed by the program modules 415 described herein.

The sensors 441 may include various sensors embedded in the housing 102 described in FIGS. 1 and 2A, including acceleration/gyro sensors, magnetometer sensors, heart rate monitor (HRM) sensors, as well as a camera sensor, etc. These sensors are communicatively coupled to the system 401 and can provide input signals as described herein. The light sources 210 (e.g., light sources 210*a*, 210*b*, 220*a*, and 220*b*) within the device 100 are optically connected to a passive interface 460 (e.g., the band 106). The passive interface provides an interactive display to a user when the light sources 210 emit light via the optical connection. The I/O interfaces include other input/output interfaces of the device 100 including various buttons, etc., coupled and/or connected to the device 100.

Figure 5:
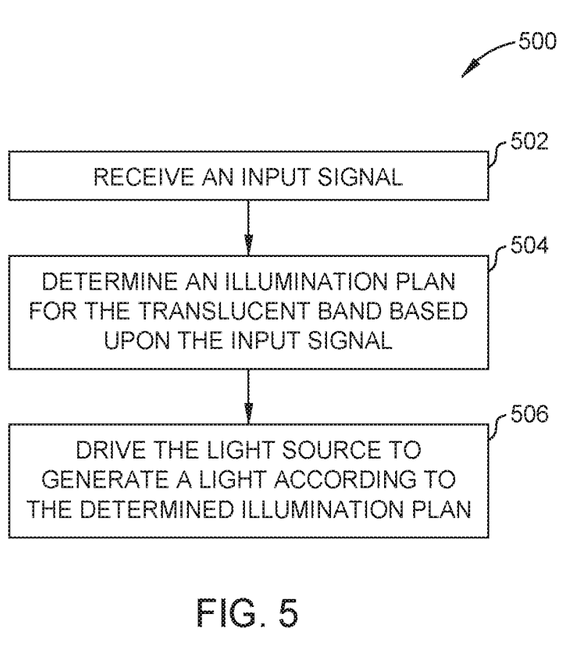
FIG. 5 is a method for illuminating a passive interface, according to one embodiment described herein.

FIG. 5 is a method for illuminating a passive interface, according to one embodiment described herein. Method 500 begins at block 502 where the system 401 receives an input signal. In some examples, the input signal module 411 receives the input signal from the application module 413. For example, a user interacting with the device 100 playing a game or using some other application of the system 401 performs an action or otherwise causes the application module 413 to indicate to the input signal module 411 to illuminate the band 106.

In some examples, the input signal may also come from outside of the device 100. For example, the input signal may be received via the antennas 205. For example, when a user approaches a certain area, an external radio (e.g., a Bluetooth, Wi-Fi, etc.) radio may transmit a signal to the device 100 via the antennas 205 to indicate to the input signal module 411 to illuminate the band 106. For example, the external interactive components 155 in the environment 150 may transmit signals to the device 100 to cause the device to illuminate the band 106.

In some examples, the sensors 441 may receive a signal that user has performed an action (e.g., flicked their wrist, made a throwing motions, or other movement). The sensors 441 and the application module 413 determine that the band 106 should be illuminated in response to the sensor signals and sends the input signal to the input signal module 411.

At block 504, the system 401 determines an illumination plan for the translucent band based upon the input signal. In some examples, the illumination plan is determined based on the input signal. For example, a specific color light or illumination pattern may be determined based on the context of the device 100 (e.g., within the environment 150). For example, a user entering a specific area of the environment 150 may cause the band 106 to blink on and off in a red color. In another example, another area may cause the band 106 to have a solid illumination in a green color, among other examples.

In some examples, the illumination plan is also determined based on the features 350. In some examples, a user, using the display 104 and the I/O interfaces may indicate what type of band is connected to the device 100. For example, when a user interchanges or replaces the band 106, the new band may be indicated to the system 401 via the various input interfaces. In another example, the antennas and other system determines a band type and the various band features, such as features 350, via the feature identifier 355. The illumination plan can then leverage the identified features 350 to provide an interactive display to a user.

At block 506, the system the system 401 drives the light source to generate a light according to the determined illumination plan. For example, the system 401 causes the light sources 210 to emit a certain color of light or emits the lights according to a pattern (blinking, cycling, etc.). Thus the system 401 provides the user with an interactive display via the passive interface of the band 106 without increasing the cost, size and complexity of the device 100.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As described above, including in relation to FIG. 4, various computing components may be included to perform the methods described herein. For example, bus 450 represents one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Further, system 401 typically includes a variety of computer system readable media. Such media may be any available media that is accessible by system 401, and it includes both volatile and non-volatile media, removable and non-removable media.

Memory 410 can include computer system readable media in the form of volatile memory, such as random access memory (RAM) and/or cache memory. System 401 may further include other removable/non-removable, volatile/non-volatile computer system storage media. In some examples, storage system 420 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 450 by one or more data media interfaces.

As depicted and described above, memory 410 may include at least one program product having a set (e.g., at least one) of program modules 415 that are configured to carry out the functions of embodiments of the invention. System 401 may further include other removable/non-removable volatile/non-volatile computer system storage media. In some examples, storage system 420 may be included as part of memory 410 and may typically provide a non-volatile memory for the networked computing devices, and may include one or more different storage elements such as Flash memory, a hard disk drive, a solid state drive, an optical storage device, and/or a magnetic storage device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A wearable electronic device comprising:
   a base assembly comprising:
   a processing unit;
   one or more transparent antennas communicatively coupled to the processing unit;
   a band interface comprising a portal for light to pass through a housing of the base assembly; and
   a light source attached to the base assembly and optically coupled to the portal of the band interface, wherein a light emitted by the light source passes through at least a subset of the one or more transparent antennas and the portal, and wherein the processing unit drives the light source to emit light in response to signals from the one or more transparent antennas; and
   a translucent band attached to the band interface, wherein the translucent band is illuminated by the light emitted from the light source via the portal.

2. The wearable electronic device of claim 1, wherein the light source is positioned in the base assembly to provide a side illumination to the band interface, wherein the light source is optically coupled to the band interface via the side illumination.

3. The wearable electronic device of claim 1, further comprising one or more light guides within the base assembly, wherein the light source is optically coupled to the band interface via the one or more light guides.

4. The wearable electronic device of claim 1, wherein the translucent band is removably coupled to the band interface.

5. The wearable electronic device of claim 1, wherein the translucent band is fixed to the band interface.

6. The wearable electronic device of claim 1, wherein the translucent band comprises one or more light altering features, wherein the one or more light altering features provide interactive feedback to a user when illuminated.

7. The wearable electronic device of claim 1, further comprising one or more sensors, wherein the one or more sensors are communicatively coupled to a processing unit in the base assembly, and wherein the processing unit drives the light source to emit light in response to signals from the one or more sensors.

8. The wearable electronic device of claim 1, further comprising a base assembly housing structure and wherein the band interface comprises an interface component in the base assembly housing structure.

9. The wearable electronic device of claim 1, wherein the translucent band is operable to couple the wearable electronic device to a wrist of a user.

10. An apparatus comprising:
a base assembly comprising:
a processing unit;
one or more transparent antennas communicatively coupled to the processing unit;
a passive display interface comprising a portal for light to pass through a housing of the base assembly; and
a light source attached to the base assembly and optically coupled to the portal of the passive display interface, wherein a light emitted by the light source passes through at least a subset of the one or more transparent antennas to the portal, and wherein the processing unit drives the light source to emit light in response to signals from the one or more transparent antennas; and
a translucent passive display attached to the passive display interface, wherein the translucent passive display is illuminated by the light emitted from the light source via the portal.

11. The apparatus of claim 10, wherein the light source is positioned in the base assembly to provide a side illumination to the passive display interface, wherein the light source is optically coupled to the passive display interface via the side illumination.

12. The apparatus of claim 10, further comprising one or more light guides within the base assembly, wherein the light source is optically coupled to the passive display interface via the one or more light guides.

13. The apparatus of claim 10, wherein the translucent passive display comprises one or more light altering features, wherein the one or more light altering features provide interactive feedback to a user when illuminated.

14. A system comprising:
one or more transparent antennas;
a band interface comprising a portal for light to pass through a housing of a base assembly;
a light source optically coupled to the portal of the band interface, wherein the one or more transparent antennas are disposed between the light source and the band interface such that light emitted by the light source passes through at least a subset of the one or more transparent antennas to the portal;
a translucent band attached to the band interface;
a computer processor communicatively coupled to the one or more transparent antennas; and
a memory containing a program which when executed by the computer processor performs an operation comprising:
receiving an input signal from the one or more transparent antennas;
determining an illumination plan for the translucent band based upon the input signal; and
driving the light source to generate a light according to the determined illumination plan, wherein the light illuminates the translucent band according to the illumination plan via the portal.

15. The system of claim 14, wherein the light source is positioned to provide a side illumination to the band interface, wherein the light source is optically coupled to the band interface via the side illumination.

16. The system of claim 14, wherein the translucent band comprises one or more light altering features, wherein the one or more light altering features provide interactive feedback to a user when illuminated, and wherein the illumination plan is further determined based on the one or more light altering features.

17. The system of claim 14, further comprising one or more sensors, wherein the input signal is received from the one or more sensors.

18. The system of claim 14, further comprises an interface component, and wherein the input signal is received from a user via the interface component.

* * * * *